April 2, 1968 P. GEYER 3,375,549
METHOD AND APPARATUS FOR REFINING AND
SEPARATING PLASTIC MATERIALS
Filed April 5, 1961 3 Sheets-Sheet 3

INVENTOR.
PAUL GEYER
BY
*Harvey L. Bumgardner, Jr.*
ATTORNEY

United States Patent Office 3,375,549
Patented Apr. 2, 1968

3,375,549
METHOD AND APPARATUS FOR REFINING AND SEPARATING PLASTIC MATERIALS
Paul Geyer, Detroit, Mich., assignor to Uniroyal, Inc., a corporation of New Jersey
Filed Apr. 5, 1961, Ser. No. 100,997
12 Claims. (Cl. 18—12)

ABSTRACT OF THE DISCLOSURE

A screw-powered extrusion apparatus for working plastic material including a rotor mounted in a cylindrical bore having an inlet and an outlet, the rotor being in the form of a screw having one or more helical feed threads usuall of constant pitch or lead and an equal number of separating threads of greater lead, each separating thread laterally defining in the surface of the rotor, in conjunction with the adjacent feed thread or threads, a feed groove of progressively diminishing cross-sectional area and blind at the end thereof nearest the outlet and a discharge groove of progressively increasing cross-sectional area and blind at the end thereof nearest the inlet.

---

This invention relates to a method and apparatus for refining and separating plastic materials. More particularly, it relates to a method and apparatus for refining cured or scorched rubber compounds and for separating the larger hard particles therefrom.

The refining of cured or scorched rubber compounds is an important processing operation in the rubber industry. Heretofore, the final breakdown of the small hard particles in such compounds has been accomplished on a refiner mill. It is an object of the present invention to provide a new and improved method of refining such compounds and of separating the coarser hard particles therefrom.

It is another object of the invention to provide new and improved apparatus suited to the practice of the aforesaid method.

It is a further object of the invention to provide a new and improved method and apparatus suited to the processing of various plastic materials wherein refining problems are encountered similar to those encountered in the processing of cured or scorched rubber compounds.

It is a still further object of the invention to provide a new and improved method and apparatus for separating relatively coarse particles from plastic materials, with or without accompanying refining of the smaller particles in such material.

For a better understanding of the present invention together with other and further objects thereof, reference is had to the following description, taken in connection with the accompanying drawings, and its scope will be pointed out in the appended claims.

In the drawings:

FIG. 4a is a partial view similar to FIG. 4 showing a variant form of the invention.

Figure 1:
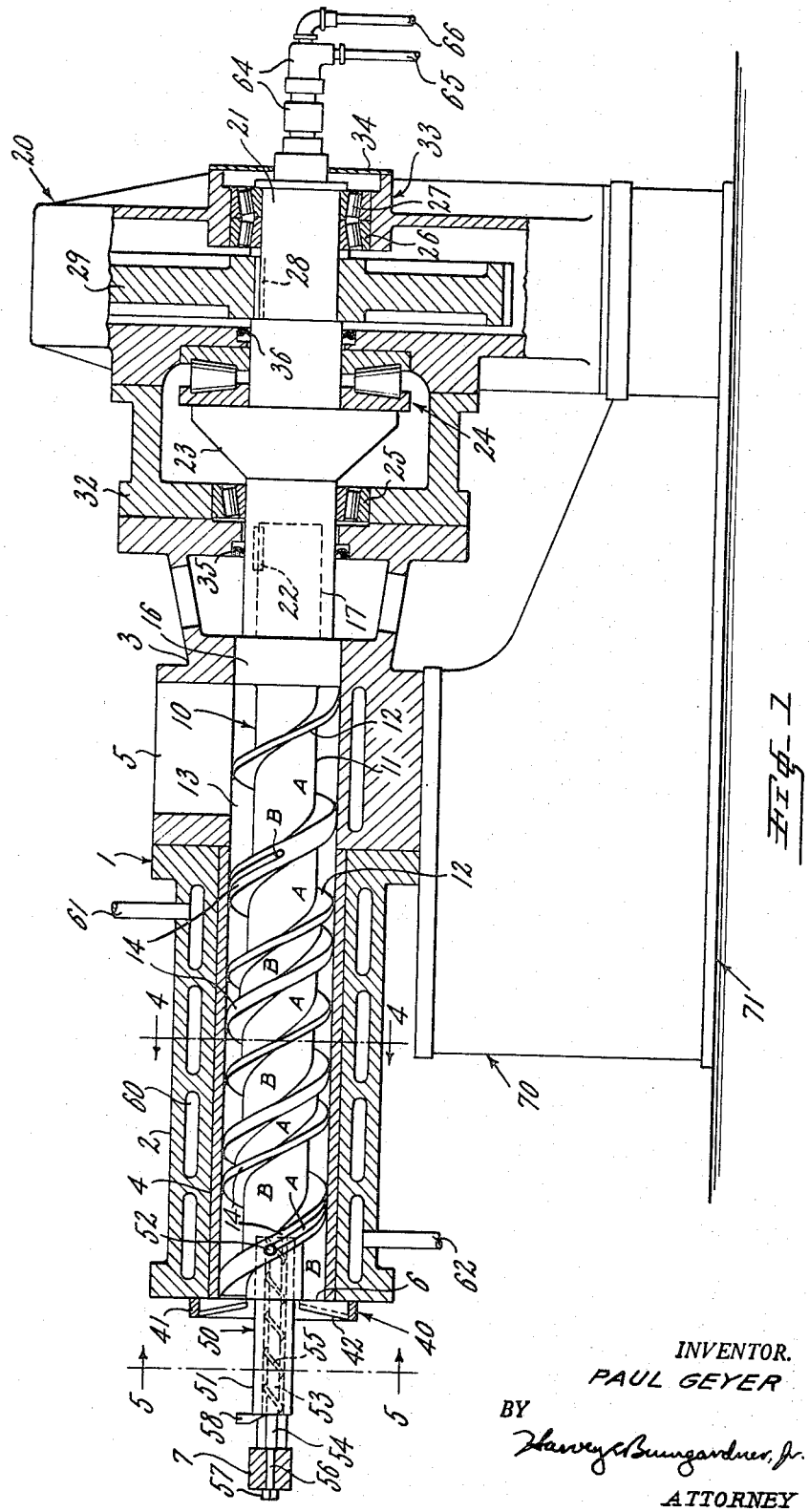
FIG. 1 is a side elevational view of apparatus employing the invention with the housing and portions of the drive assembly shown in section.

Referring now to the drawings, wherein like reference numerals denote corresponding parts throughout the several views, the apparatus as shown in FIG. 1 is comprised of the following major components: the housing or barrel assembly 1, the rotor or refining screw 10, the drive transmission and thrust support assembly 20, the extrudate slicer 40, the scavenging extruder 50, the cooling or heating system 60–67 and the base 70. The requisite source of rotary drive and the apparatuses for delivery of unrefined feed stock to the refiner-separator and removal of refined stock and separated coarse-particle-containing material from the refiner-separator do not form parts of this invention and are, therefore, not shown in the drawings.

The rotor housing assembly 1 comprises two main housing sections 2 and 3 fastened together by suitable bolts or machine screws not shown. Inside the housing section 2 and enclosing the refining and extrusion zones of the apparatus is a hardened cylindrical liner 4. This liner 4, together with the cylindrical portion of housing section 3 define the barrel of the refiner. In housing section 3 there is provided a hopper or inlet opening 5 through which unrefined stock may be continuously fed to the refiner-separator. Refined stock emerges from the outlet opening 6 at the opposite end of the barrel.

Figure 3:
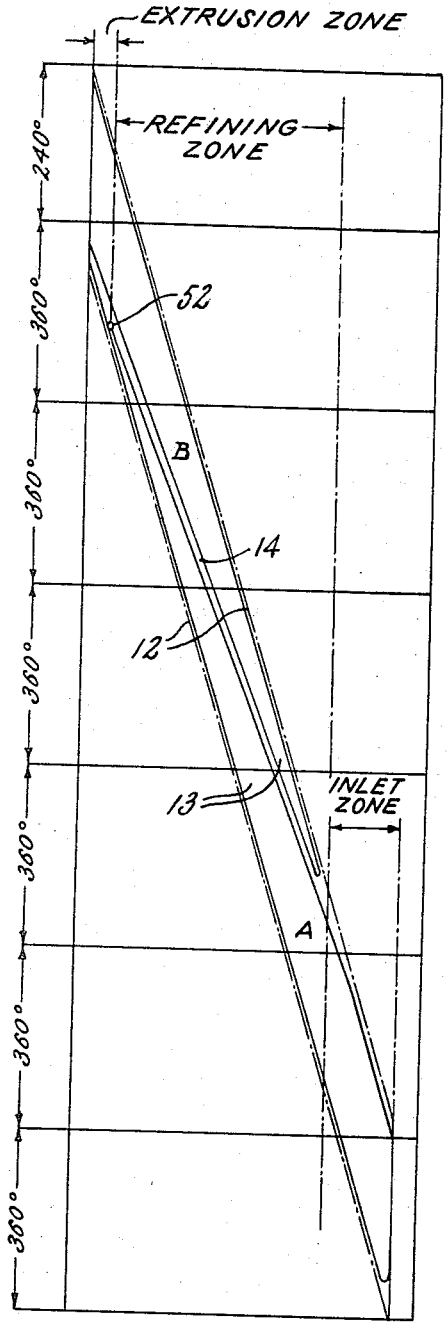
FIG. 3 is a planar development of the threads on the worm shown in FIG. 1.

The rotor 10, which is rotatably mounted in the barrel is in the form of a screw. From the surface of the central shaft 11 of the rotor 10 rises a continuous helical feed thread 12, which would normally (but not necessarily) have a constant pitch. Proceeding longitudinally along the rotor shaft 11 successively through the inlet zone, the refining zone and the extrusion zone, the leading and trailing faces of this feed thread 12 define a helical groove 13 in which the stock to be refined is carried through the barrel of the refiner-separator from inlet 5 to outlet 6. Referring now to FIG. 3 wherein is shown a planar development of the surface of the rotor, the feed groove 13 is intersected by a helical refining thread 14 having a greater pitch or lead than the lead of the feed thread 12. The refining thread 14 divides the feed groove 13 into two grooves A and B of the shape and arrangement shown in FIG. 3.

When the rotor 10 is rotated in the barrel, unrefined material or stock is picked up by the groove A in the inlet zone and is forced along the groove A by the feeding thread 12. Since the groove A is, for all practical purposes, a blind groove, as the unrefined stock enters the refining zone and the cross sectional area of the groove A begins to diminish, the pressure builds up in the stock forcing it through the narrow aperture defined by the clearance between the interior surface of the barrel and the addendum surface of the refining thread 14 into the groove B. It is while passing through this narrow aperture that the stock is refined or worked into extremely fine particles. The refined stock in groove B is again picked up by the feed thread 12 and carried out of the refining zone, through the extrusion zone and forced from the outlet 6 of the barrel.

A collar 16 separates the working end of the rotor 10 from the shank 17 of the rotor.

Figure 2:
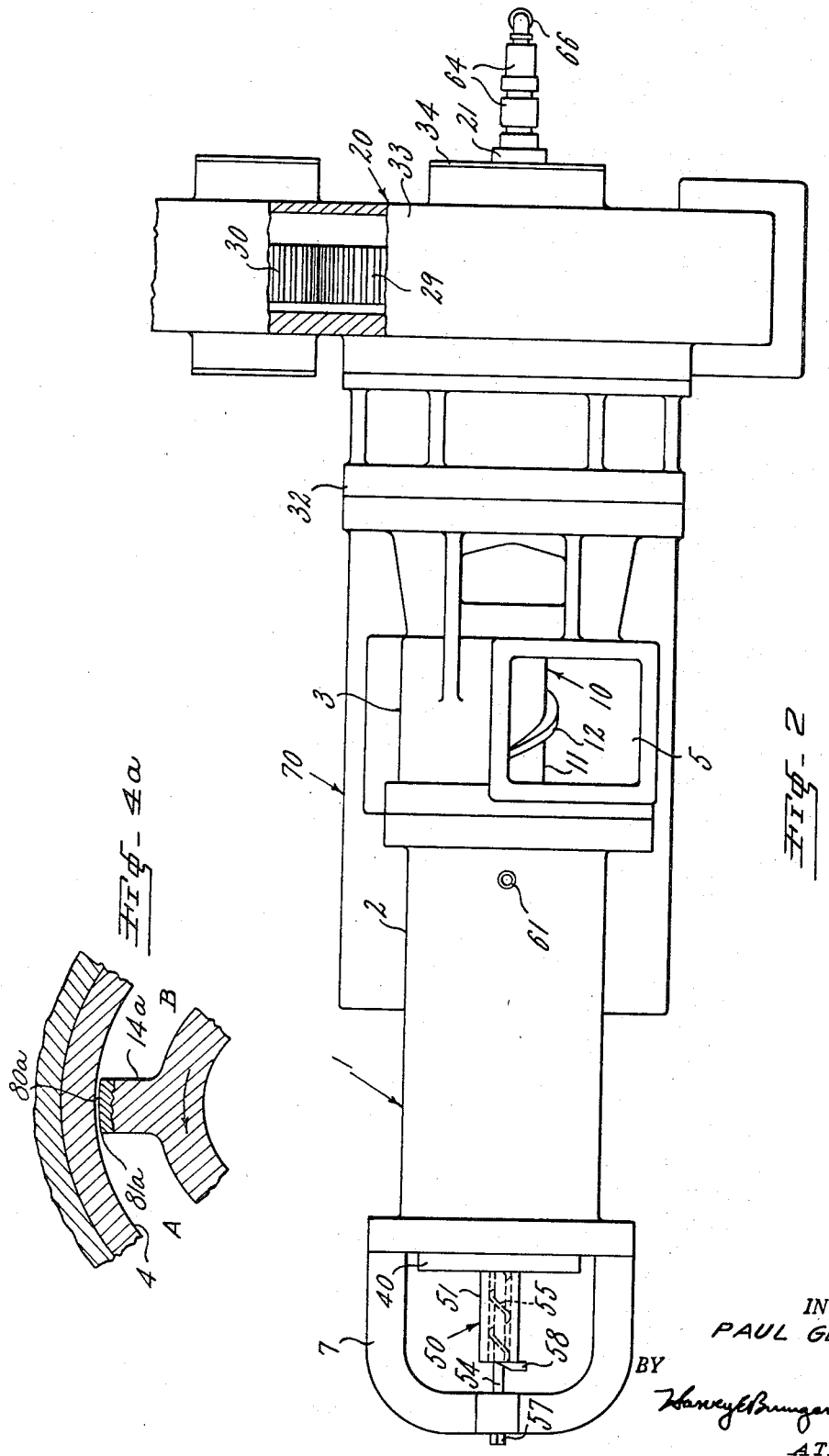
FIG. 2 is a top plan view of the apparatus shown in FIG. 1 partially broken away.

Referring now to FIGS. 1 and 2, the assembly which transmits rotational drive to the rotor 10 and supports the thrust of the stock on the rotor is shown generally at 20. The drive shaft 21 is rotationally locked to the shank 17 of the rotor by the key 22. The drive shaft 21 is provided with a flange 23 which bears against the thrust bearing 24 which, in turn, transmits the thrust developed in the rotor from the drive shaft 21 to the drive assembly housing 33. Additional bearings 25, 26 and 27 are provided to support and facilitate the rotation of the rotor 10 and the drive shaft 21. Also affixed to the drive shaft 21 by the key 28 is a driving gear 29. Rotation is imparted to the driving gear 29 by the intermediate gear 30, which, in turn, is rotated by a primary source of rotational drive, such as an electric motor, not shown, through additional power transmission elements, not shown. The rotational drive transmission and thrust support assembly 20 is housed in a conventional machine housing, sections of which are shown at 32 and 33. A cover plate 34 closes the end of the housing 33 and provides access to the bearings 26 and 27. Cover plate 34 and housing sections 32 and 33 are joined to each other and to housing section 3 of the barrel assembly by suitable bolts or machine screws, not shown. Suitable gaskets or seals 35 and 36 are provided to seal off the thrust bearing 24 from the cavities in the adjacent housing sections.

Figure 5:
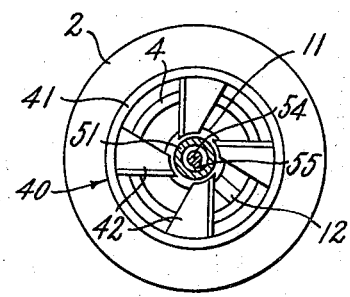
FIG. 5 is a sectional view on line 5—5 of FIG. 1.

Referring now to FIGS. 1 and 5, as the refined stock is forced from the outlet 6 of the barrel by the feed thread 12, it passes through the cutting head shown generally at 40. The cutting head 40, which is employed to slice the refined extrudate into pellets for convenient handling, comprises a ring 41 which is affixed by suitable screws, not shown, to body section 2. To the ring 41 are affixed four knives 42 which extend radially inward towards the center of the outlet 6, the cutting edges of the knives 42 being substantially flush with the plane of the outlet 6.

Some plastic materials contain substantial amounts of coarser particles which will not conveniently pass over the refining thread 14 from groove A to groove B. Consequently, when the apparatus of this invention is used for refining such materials, means, shown generally at 50, must be provided to prevent the accumulation of such coarser particles at the narrow end of groove A and the consequent clogging of groove A. A preferred means of scavenging such coarse particles from groove A at a controlled rate of flow is the scavenging extruder shown in FIG. 1 fed by the weep hole 52 at the blind end of groove A. The scavenging extruder comprises a barrel 51 which is recessed in and affixed to the rotor 10 by suitable means, not shown, such as a key or threads. The scavenging extruder barrel 51, then, rotates with the rotor 10. The weep hole 52 communicates from the blind end of the groove A to the internal bore of the scavenging extruder barrel 51. Rotatably mounted in the scavenging extruder barrel 51 is the scavenging extruder screw comprising a shaft 54 on which is provided a continuous raised helical feed thread 55 defining, with the internal bore of the barrel 51, the scavenging feed groove 53. The shaft 54 is provided with a threaded end 56 which is screwed into the yoke 7 of the housing assembly 1 and locked by the lock nut 57 to prevent any rotation of the scavenging extruder screw. The ribbon of extrudate issuing from the scavenging extruder is cut into convenient pellets for handling by the knife 58 affixed by suitable screws, not shown, to the scavenging extruder barrel 51.

The temperature of the material being refined is controlled by circulating water through the passages 60 provided in the barrel housing section 2 serviced by the water inlet conduit 61 and the outlet conduit 62. Additional means of heating or removing heat from the stock being refined is provided by the bore 63 extending through the drive shaft 21 and through the rotor 10 to a point close to the recessed face of the scavenging extruder barrel 51. At the outer end of the drive shaft 21, this bore 63 is connected by suitable fittings 64 to the water outlet 65. Water is fed into the bore 63 at the scavenging extruder end of the bore 63 by an external water inlet 66 which, passing through the fittings 64, is connected to an internal water inlet conduit 67 running almost the entire length of the bore 63.

The entire refiner-separator apparatus is mounted, by suitable bolts or machine screws, not shown, on the base 70 which, in turn, may be affixed by suitable studs, not shown, to the floor 71.

Figure 4:
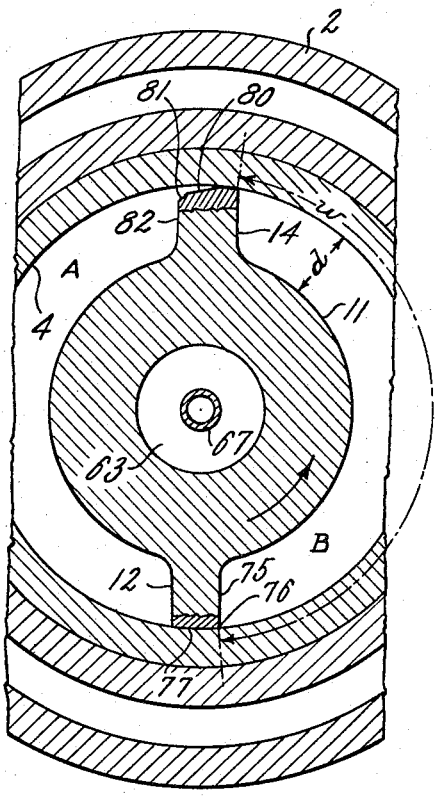
FIG. 4 is a sectional view on line 4—4 of FIG. 1.

Referring now to FIG. 4, the leading face 75 of the feed thread 12, as viewed in section, is substantially parallel to the radius of the rotor 10 or may even be undercut somewhat. Consequently, this leading face 75, at its intersection with the arcuate addendum surface 77 of the feed thread 12, forms a sharp, near-rectangular leading edge 76.

The leading face 82 of the refining thread 14 may also, when viewed in section, be parallel to the radius of the rotor 10, but, instead of being arcuate, the addendum surface 80 of the refining thread 14 is sloped to permit easy feeding of the particles of unrefined material into the refining aperture between the addendum surface 80 and the interior surface of the barrel. Feeding of the particles of unrefined stock into the narrow aperture is further facilitated by the bevel 81 provided at the leading edge of the refining thread 14. As shown in FIG. 4, the portions of both threads 12 and 14 adjacent to the addendum surfaces 77 and 80 of said threads are formed of a hard, wear-resistant material such as Stellite.

The feed thread 12 will have a relatively close working clearance with the interior surface of the barrel liner 4. A clearance of .020 inch has been found satisfactory for the rotor having an addendum diameter of 10 inches. Normally, the addendum surface 80 of the refining thread 14 will have the somewhat greater clearance with the interior surface of the barrel liner 4. In the case of the aforementioned 10-inch diameter rotor, a minimum barrel clearance of .025 inch has been found satisfactory for the refining thread.

It should be noted that several variations might be made in the apparatus as hereinbefore described without defeating (and perhaps enhancing, in some applications) the principal objects of the invention. For instance, while the interior surface of the barrel will usually be cylindrical, it is possible that the cross-sectional diameters of both barrel and rotor could be varied longitudinally. Also the screw could be provided with two or more feed threads defining an equal number of feed grooves.

Referring to FIG. 4, it is believed that maintaining dimensions of grooves A and B at a constant $w/d$ ratio of 3 throughout the length of the screw results in an optimum design for the rotor. However, it has been found that a rotor made with a constant $d$ dimension and a varying $w$ dimension is satisfactory in operation, and other dimensional variations in design will, no doubt, give satisfactory results.

The method of refining plastic materials such as scorched or cured rubber stocks while simultaneously separating the coarser particles therefrom employing the apparatus hereinbefore described is as follows: The rotor 10 is set in rotation by starting up the primary source of mechanical drive, not shown. Next, the flow of cooling or heating water to the water inlets 61 and 66 are properly adjusted for the desired degree of heat removal or addition. Then a continuous flow of unrefined stock is introduced into the inlet hopper 5 by means not shown. The unrefined stock is picked up by the feed thread 12 in the inlet zone of the refiner and forced along the groove A into the refining zone. In the refining zone, as the cross-sectional area of the groove A progressively diminishes, the unrefined stock is forced through the narrow aperture between the refining thread 14 and the interior surface of the barrel liner 4 where the coarse particles of the unrefined stock are broken down into fine particles. The bulk of the stock, which is passed over the refining thread 14 into the groove B, is then progressively forced by the feeding thread 12 through the extrusion zone to the outlet 6 where it is sliced into pellets, suitable for convenient handling, by the knives 42. Throughout all three zones in the barrel of the refiner, the stock, both unrefined and, subsequently, refined, is continuously churned by the action of the rotor so that the extrudate emerging from the outlet 6 is a fairly homogeneous mixture of the unrefined materials fed into the inlet hopper 5. The larger coarse particles in the unrefined stock which will not conveniently pass over the refining thread 14 are progressively fed by the feed thread 12 towards the blind end on the groove A where they pass through the weep hole 52 into the bore of the scavenging extruder barrel 51. The rate of passage of this material through the weep hole is controlled by the rate of flow permitted by the scavenging extruder 50. As this coarse material is carried through the barrel 51 of the scavenging extruder by the relative rotation of the fixed scavenging extruder worm, it, too, is sliced by a knife for handling.

The method and apparatus heretofore described is suited to refining plastic materials while simultaneously separating the coarser particles therefrom. It should be appreciated that the make-up of some feed stocks may be such that it will be both possible and desirable to refine all of the material without permitting or providing for the scavenging or separating of the coarser particles. In such event the apparatus heretofore described would be modified by eliminating the weep hole 52 and the scavenging extruder 50, and the method would be simplified accordingly.

In the event that it were desired to simply separate coarse particles from a plastic material without any substantial refining of the material, the apparatus and method heretofore described would be modified, as shown in FIG. 4a, by substituting a separating thread 14a for the refining thread 14. The addendum surface 80a of the separating thread 14a would be substantially arcuate, the arc of said surface having substantially the same radius as the corresponding radius of the interior surface of the barrel 14. No bevel would ordinarily be provided at the leading edge 81a, and the size of the particles effectively separated from the plastic material would be controlled by varying the clearance between the addendum surface 80a of the separating thread 14a and the interior surface of the barrel 4.

From the foregoing, it is believed that the method and apparatus for practicing this invention will be readily comprehended by persons skilled in the art. It is to be clearly understood, however, that various changes in the apparatus herewith shown and described and in the method of practicing the invention, outlined above, may be resorted to without departing from the spirit of the invention as defined by the appended claims. While the foregoing apparatus and method have been described primarily in connection with the refining of materials such as cured or scorched rubber stocks while simultaneously separating the coarser particles therefrom, it is particularly to be understood that this apparatus and method, with or without minor changes and adjustments, may readily be employed in refining and separating or otherwise processing other plastic materials.

Having thus described my invention, what I claim and desire to protect by Letters Patent is:

1. In a machine for ejecting plastic material, said machine having a screw conveyor rotatably mounted in the bore of a cylinder and operable to move said plastic material from one end of said cylinder to the other to progressively change said plastic material from the solid to a fluent phase for extrusion of the fluent phase from an extruding head, having an extrusion port and mounted on the other end of the cylinder, first means structurally integral with said screw conveyor for operably exerting continuous pressure on said moving plastic material, second means structurally integral with said screw conveyor for continuously leading off the fluent phase progressively changed from the solid phase by contact with said cylinder and formed as a coating between the remaining solid phase and the cylinder, said fluent phase being directed away from, and not through, the remaining solid phase, and for bringing successive portions of said solid phase material progressively into contact with said heated cylinder, said fluent phase thereby being continuously separated from said remaining solid phase, and third means structurally integral with said screw conveyor for directing said fluent phase toward and through said extruding head, whereby insulation of portions of the solid phase by said coat of the fluent phase is avoided to achieve a rapid change in phase of the plastic material as it passes through said cylinder and increased speed of operation of said screw conveyor with a correspondingly high output to said extruding head.

2. In a machine for ejecting plastic material, said machine having a screw conveyor rotatably mounted in the bore of a cylinder and operable to move said plastic material from one end of said cylinder to the other to progressively change said plastic material from the solid to a fluent phase for extrusion of the fluent phase from an extruding head, having an extrusion port, mounted on the other end of the cylinder, the combination comprising: first means structurally integral with said screw conveyor for operably exerting continuous pressure on said moving plastic material; second means structurally integral with said screw conveyor for continously leading off the fluent phase progressively changed from the solid phase by contact with said cylinder and formed as a coating between the remaining solid phase and the cylinder, said fluent phase being directed away from, and not through, the remaining solid phase, and for bringing successive portions of said solid phase material progressively into contact with said cylinder, said fluent phase thereby being continuously separated from said remaining solid phase; and third means structurally integral with said screw conveyor for directing said fluent phase toward and through said extruding head.

3. A rotor, in the form of a screw, adapted to be rotatably mounted in a cylindrical bore, having an inlet and an outlet, of an extruder to form a screw conveyor to move plastic material from the inlet to the outlet of said bore while progressively changing said material from a solid to a fluent phase, said rotor comprising: at least one helical feed thread, integral with said rotor, for advancing said material through said bore in contact therewith, whereby said material in contact with said bore will be transformed to and maintained in a fluent phase; and an equal number of helical separating threads, integral with said rotor, each having a greater lead than the lead of each adjacent feed thread; each said separating thread, in conjunction with an adjacent feed thread, laterally defining, in the surface of said rotor, a helical feed groove of progressively diminishing cross-sectional area and blind at the end thereof adapted to be operably positioned nearest the outlet of the bore and an adjacent helical discharge groove of progressively increasing cross-sectional area and blind at the end thereof adapted to be operably positioned nearest the inlet of said bore; each said separating thread having such greater clearance with said bore than that of each adjacent feed thread that, upon rotation of the rotor in said bore, the fluent phase formed in contact with the bore will pass from each said feed groove to the adjacent discharge groove and successive portions of the remaining solid phase will contact said bore while remaining in each said feed groove.

4. Apparatus for working plastic material comprising an annular member having a bore therethrough, means to introduce material to be worked into said bore adjacent one end thereof, a rotatable shaft extending through said bore, the bounding surface of said shaft conforming substantially to a surface of revolution, a first helical thread on said shaft extending from said bounding surface toward the walls of said bore, and a second helical thread on said shaft also extending from said bounding surface toward the walls of said bore and having a different pitch from said first helical thread, said threads having unlike clearances from said bore and extending in interlaced relation along said shaft toward the other end of said bore substantially to a point of intersection with each other between said first-named means and the other end of said bore.

5. The apparatus of claim 3 wherein the aggregate cross-sectional area of each said feed groove and its adjacent discharge groove separated therefrom by a separating thread remains substantially constant throughout that portion of the axial length of the rotor occupied coextensively by said grooves.

6. The apparatus of claim 3 wherein the cross-sectional areas of each said feed groove and its adjacent discharge groove separated therefrom by a separating thread are maintained in such relationship throughout the coextensive lengths thereof as to promote a substantially uniform rate of passage of said fluent phase from the feed groove to the adjacent discharge groove throughout the length of the separating thread.

7. The apparatus of claim 3 wherein the clearance between each separating thread and the bore is substantially constant throughout the length of the separating thread and the cross-sectional areas of each feed groove and the adjacent discharge groove separated therefrom by a separating thread are varied throughout the lengths thereof respectively to promote a substantially uniform velocity of flow of plastic material along each said groove throughout its length.

8. The apparatus of claim 3 wherein the blind end of each said feed groove is provided with outlet means for progressively removing therefrom a limited amount of said plastic material and for directing said limited amount of plastic material out of said extruder separately from the rest of said plastic material.

9. Apparatus for working plastic material including an annular member provided with a bore therethrough; inlet means to introduce material to be worked into said bore adjacent one end thereof; outlet means to permit the ejection of said material after working from the other end of said bore; and a rotor, in the form of a screw rotatably mounted in said bore, said rotor comprising: at least one helical feed thread, integral with said rotor, for advancing said plastic material through said bore, partially in contact therewith, from the inlet to the outlet thereof; and a number, equal to the number of said feed threads, of helical separating threads, integral with said rotor, each having a lead greater than that of the adjacent feed thread; each said separating thread, in conjunction with a feed thread adjacent thereto, laterally defining, in the surface of said rotor, a helical feed groove of progressively decreasing cross-sectional area and blind at the end thereof operably positioned nearest the outlet means; each said separating thread additionally, in conjunction with an adjacent feed thread, laterally defining, in the surface of said rotor, a helical discharge groove of progressively increasing cross-sectional area and blind at the end thereof operably positioned nearest the inlet means; said feed groove and said discharge groove being coextensive only within said bore between said inlet means and said outlet means; each said separating thread having such greater clearance with said bore than that of each adjacent feed thread that, upon rotation of the rotor in said bore, the plastic material being worked will progressively pass between the bore and each said separating thread from the feed groove adjacent thereto to the discharge groove adjacent thereto.

10. The apparatus of claim 9 wherein the aggregate cross-sectional area of each said feed groove laterally defined on one side by a separating thread and of the adjacent discharge groove laterally defined on one side by the same separating thread remains substantially constant throughout that portion of the axial length of the rotor occupied coextensively by said grooves.

11. The apparatus of claim 9 wherein the cross-sectional areas of each said feed groove and the adjacent discharge groove each laterally defined on one side by the same separating thread are maintained in such relationship, throughout the length of said separating thread, as to promote a substantially uniform rate of passage of said fluent phase from said feed groove to said adjacent discharge groove throughout the length of said separating thread.

12. The apparatus of claim 9 wherein the clearance between each separating thread and the bore is substantially constant throughout the length of said separating thread and the cross-sectional areas of each feed groove and the discharge groove adjacent thereof and laterally defined each on one side by the same separating thread are varied respectively throughout the length of said separating thread to promote a substantially uniform velocity of flow of plastic material along each said groove throughout the length of said separating thread.

References Cited

UNITED STATES PATENTS

| | | | |
|---|---|---|---|
| 2,765,490 | 10/1956 | Zona | 18—12 |
| 2,765,491 | 10/1956 | Mager Kurth | 18—12 |
| 2,871,516 | 2/1959 | Sherman et al. | 18—2 X |
| 2,848,739 | 8/1958 | Henning | 18—55 |
| 2,200,997 | 5/1940 | Royle | 18—12 |
| 2,583,600 | 1/1952 | Schreiber. | |
| 1,333,249 | 3/1920 | Fiddyment | 100—117 |
| 2,343,529 | 3/1944 | Brown | 18—12 |
| 2,537,395 | 1/1951 | Brown | 18—12 |
| 2,433,936 | 1/1948 | Tornberg | 18—12 |

WILLIAM J. STEPHENSON, *Primary Examiner.*

MORRIS LIEBMAN, *Examiner.*

W. E. THOMPSON, L. S. SQUIRES, M. H. ROSEN, *Assistant Examiners.*